(12) United States Patent
Calis et al.

(10) Patent No.: US 7,811,966 B2
(45) Date of Patent: Oct. 12, 2010

(54) CATALYST, CATALYST PRECURSOR, AND CATALYST CARRIER

(75) Inventors: Hans Peter Alexander Calis, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/016,692

(22) Filed: Jan. 18, 2008

(65) Prior Publication Data

US 2008/0262115 A1    Oct. 23, 2008

(30) Foreign Application Priority Data

Jan. 18, 2007   (EP)   .................................. 07100746

(51) Int. Cl.
  B01J 23/00    (2006.01)
  B01J 21/00    (2006.01)
  B01J 20/00    (2006.01)
  B01J 29/00    (2006.01)
  B01J 37/00    (2006.01)

(52) U.S. Cl. ........................ 502/326; 502/258; 502/259; 502/260; 502/261; 502/262; 502/263; 502/327; 502/332; 502/333; 502/334; 502/335; 502/336; 502/337; 502/338; 502/339; 502/350; 502/355; 502/415; 502/439; 502/527.12; 502/527.17

(58) Field of Classification Search .................. 502/258, 502/259, 260, 261, 262, 263, 326, 327, 332, 502/333, 334, 335, 336, 337, 338, 339, 350, 502/355, 415, 439, 527.12, 527.17
See application file for complete search history.

(56) References Cited

U.S. PATENT DOCUMENTS 3,764,565 A    10/1973   Jacobs et al. ................. 252/470

(Continued)

FOREIGN PATENT DOCUMENTS

AU                698392              10/1998

(Continued)

OTHER PUBLICATIONS

International Search Report dated Mar. 16, 2004.

(Continued)

*Primary Examiner*—Cam N Nguyen

(57) ABSTRACT

A catalyst, catalyst precursor, or catalyst carrier formed as an elongated shaped particle having a cross section comprising three protrusions each extending from and attached to a central position. The central position is aligned along the longitudinal axis of the particle. The cross-section of the particle occupies the space encompassed by the outer edges of six outer circles around a central circle, each of the six outer circles contacting two neighbouring outer circles, the particle occupying three alternating outer circles equidistant to the central circle and the six interstitial regions, the particle not occupying the three remaining outer circles which are between the alternating occupied outer circles. The ratio of the diameter of the central circle to the diameter of the outer occupied circle is more than 1, and the ratio of the diameter of the outer unoccupied circle to the diameter of the outer occupied circle is more than 1. The ratio of the diameter of the outer unoccupied circle to the diameter of the outer occupied circle is more than the ratio of the diameter of the central circle to the diameter of the outer occupied circle.

16 Claims, 1 Drawing Sheet

U.S. PATENT DOCUMENTS

| | | | | |
|---|---|---|---|---|
| 4,028,221 A | | 6/1977 | Sze et al. ............... 208/8 |
| 4,116,817 A | * | 9/1978 | Frayer et al. ............. 208/210 |
| 4,116,819 A | * | 9/1978 | Frayer et al. ........... 208/216 R |
| 4,118,310 A | * | 10/1978 | Frayer et al. ............. 208/210 |
| 4,133,777 A | * | 1/1979 | Frayer et al. ............. 502/309 |
| 4,328,130 A | * | 5/1982 | Kyan ..................... 502/100 |
| 4,342,643 A | * | 8/1982 | Kyan ..................... 208/134 |
| 4,391,740 A | * | 7/1983 | Gibson ................... 502/305 |
| 4,394,303 A | * | 7/1983 | Gibson ................... 502/305 |
| 4,489,173 A | * | 12/1984 | Gibson ................... 502/313 |
| 4,495,307 A | | 1/1985 | Clements ................. 502/305 |
| 4,517,077 A | | 5/1985 | Clements ............ 208/216 R |
| 4,606,815 A | * | 8/1986 | Gibson ................... 502/305 |
| 4,628,001 A | | 12/1986 | Sasaki et al. ............. 428/367 |
| 4,645,654 A | * | 2/1987 | Barczak ............... 423/244.05 |
| 4,645,754 A | | 2/1987 | Tamura et al. ............ 502/527 |
| 4,673,664 A | * | 6/1987 | Bambrick ................ 502/439 |
| 4,975,032 A | | 12/1990 | Arai et al. ................. 418/150 |
| 6,005,121 A | | 12/1999 | Ebner et al. ............... 307/60 |
| 7,563,745 B2 | * | 7/2009 | Hoek et al. ............... 502/326 |
| 2006/0111455 A1 | * | 5/2006 | Klaver et al. ............. 518/716 |

FOREIGN PATENT DOCUMENTS

| | | |
|---|---|---|
| DE | 3315105 | 11/1983 |
| EP | 0218147 | 4/1987 |
| EP | 0220933 | 5/1987 |
| EP | 127220 | 1/1988 |
| EP | 0428223 | 5/1991 |
| EP | 4464633 | 1/1992 |
| EP | 510770 | 10/1992 |
| EP | 455307 | 8/1994 |
| EP | 0678331 | 10/1995 |
| EP | 1042067 | 10/2000 |
| GB | 1446175 | 8/1976 |
| JP | 55119445 | 9/1980 |
| WO | WO199306041 | 4/1993 |
| WO | WO199934917 | 7/1999 |
| WO | WO2003013725 | 2/2003 |
| WO | WO2003103833 | 12/2003 |

OTHER PUBLICATIONS

I. Naka and A. de Bruijn, J. Japan Petrol. Inst., vol. 23, No. 4, 1980, pp. 268-273.

International Search Report dated Sep. 11, 2003.

* cited by examiner

CATALYST, CATALYST PRECURSOR, AND CATALYST CARRIER

The present application claims the benefit of European Application 07100746.2 filed Jan. 18, 2007.

BACKGROUND OF THE INVENTION

This invention relates to a catalyst, catalyst precursor, and catalyst carrier of a particular cross sectional shape for use in catalysing reactions, particularly mass transfer limited reactions, such as Fischer-Tropsch reactions or hydrocracking reactions.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into one or more reactors where it is converted in one or more steps over a suitable catalyst at elevated temperature and pressure into mainly paraffinic compounds ranging from methane to high molecular weight modules comprising up to 200 carbon atoms, or, under particular circumstances, even more. Preferably the amount of $C_{5+}$ hydrocarbons produced is maximized and the amount of methane and carbon dioxide is minimized.

Numerous types of reactor systems have been developed for carrying out the Fischer-Tropsch reaction. For example, Fischer-Tropsch reactor systems include fixed bed reactors, especially multi-tubular fixed bed reactors, fluidized bed reactors, such as entrained fluidized bed reactors and fixed fluidized bed reactors, and slurry bed reactors such as three-phase slurry bubble columns and ebulated bed reactors.

In the past work has been devoted to the development of particles, in particular catalytically active particles, for many different processes. There has also been a considerable effort to try to understand the advantages and sometimes disadvantages of effects of shape when deviating from conventional shapes such as pellets, rods, spheres and cylinders for use in catalytic as well as non-catalytic duties. Examples of further known shapes are rings, cloverleafs, dumbbells and C-shaped particles.

Particles that can be made using extrusion, pelletizing and pressure moulding have been the subject of various studies, especially particles suitable for use in (multi tubular) fixed bed reactors. Considerable efforts have been devoted to the so-called "polylobal"-shaped particles. Many commercial catalysts are available in TL (Trilobe) or QL (Quadrulobe) form. They serve as alternatives to the conventional cylindrical shape and often provide advantages because of their increased surface-to-volume ratio, which results in a smaller effective particle size, thus providing a more active catalyst.

A variety of shapes and designs of catalyst particles for use in the fixed bed operation of the Fischer-Tropsch synthesis have been proposed. EP 428 223 describes catalyst particles in the form of hollow cylinders, for example cylinders having a central hollow space which has a radius of between 0.1 and 0.4 of the radius of the cylindrical extrudate, and rifled (or twisted) trilobes. Trilobe extrudates are said to be preferred.

When using a process employing a fixed bed of catalyst particles, a major consideration in the design of the process is the diffusion limitations of the catalyst. Different reactants will typically travel through the catalyst at different rates. Thus the surface area of the catalyst is preferably maximized to minimize diffusion limitation.

In addition to the above, the catalyst particles should be sufficiently strong to avoid undesired attrition and/or breakage. Especially in fixed beds the bulk crush strength should be (very) high, as beds are used in commercial reactors of up to 15 meters high. Especially at the lower end of the bed the strength of the catalyst particles plays an important part. The handling of catalyst before entry into the reactor also requires the catalyst to have reasonable strength.

However, providing a catalyst shape with a sufficient strength but with maximum surface area are somewhat conflicting requirements which complicates the design of further improved catalyst particles.

Furthermore, there is a need for a fast, relatively inexpensive and suitable manufacturing process which will enable the production of catalyst particles in large quantities.

To produce a strong extrudate, a trilobe catalyst with a 'cloverleaf' cross section can be made. Examples of such trilobes have been described in, for example, U.S. Pat. No. 3,857,780 and U.S. Pat. No. 3,966,644. Trilobe catalysts with a 'cloverleaf' cross section are sometimes referred to as "TL" shaped catalysts. FIG. 1 shows a perspective view of one embodiment of such a trilobe shape. A trilobe catalyst with a 'cloverleaf' cross section shows a good mechanical strength but the mass transfer limitations are considered too restrictive. Especially for Fisher Tropsch reactions and hydrocracking reactions the mass transfer limitations of such trilobe catalysts are too restrictive.

WO 03/103833 describes catalyst particles with a relatively low diffusion limitation. This document discloses an elongated shaped extrudate comprising three protrusions each extending from and attached to a central position. The cross-section of the particle can be defined by considering a central circle surrounded by six outer circles. Each of the six outer circles touches two neighbouring circles. Of the six outer circles, alternate circles are occupied by the particle's cross-section. The cross-section of the particle occupies the space encompassed by the outer edges of the six outer circles, minus the space occupied by the three remaining outer circles. The six interstitial regions, formed by the inclusions of the central circle and six times two adjacent outer circles, are also occupied by the extrudate.

The shape disclosed in WO 03/103833 is sometimes referred to as an "extended trilobe" and sometimes as "Tx" shaped catalyst. FIG. 2 shows the cross-section of one embodiment of such a shape. The cross-section of the particle has a central circle 10 and outer occupied circles 12. Interstitial areas 18 are also occupied by the cross-section of particle 1, which is shown in bold outline. The outer circles 14 are unoccupied.

In WO 03/103833 is indicated that preferred catalyst particles have a cross-section in which the three alternating circles have diameters in the range between 0.74 and 1.3 times the diameter of the central circle. There may be a distance between the three alternating circles and the central circle. If there is any overlap between the three alternating circles and the central circle it will be less than 5% of the area of the central circle. Preferably the catalyst particles have a cross-section in which the three alternating circles are attached to the central circle.

Catalyst particles according to WO 03/103833 show a relatively small amount of the unwanted mass transfer limitations but the shape has been found to suffer from poor strength, making handling outside the reactor difficult.

SUMMARY OF THE INVENTION

According to a first aspect of the present invention there is provided a catalyst, catalyst precursor, or catalyst carrier formed as an elongated shaped particle having a cross section comprising three protrusions each extending from and attached to a central position, wherein the central position is aligned along the longitudinal axis of the particle, the cross-section of the particle occupying the space encompassed by the outer edges of six outer circles around a central circle, each of the six outer circles contacting two neighbouring outer circles, the particle occupying three alternating outer circles equidistant to the central circle and the six interstitial regions, the particle not occupying the three remaining outer circles which are between the alternating occupied outer circles;

wherein the ratio of the diameter of the central circle to the diameter of the outer occupied circle is more than 1 and the ratio of the diameter of the outer unoccupied circle to the diameter of the outer occupied circle is more than 1; and wherein the ratio of the diameter of the outer unoccupied circle to the diameter of the outer occupied circle is more than the ratio of the diameter of the central circle to the diameter of the outer occupied circle.

DETAILED DESCRIPTION OF THE INVENTION

The ratio of the diameter of the central circle to the diameter of the outer occupied circle will be referred to as the 'inner ratio'. The ratio of the diameter of the outer unoccupied circle to the diameter of the outer occupied circle will be described as the 'outer ratio'. Hence, for a particle according to the present invention the outer ratio is greater than the inner ratio.

The inner ratio preferably is more than 1.2, more preferably more than 1.35, even more preferably more than 1.4. The inner ratio can be up to 2.5 preferably up to 2. A particularly preferred value for the inner ratio is 1.5.

The outer ratio is preferably more than 1.3, more preferably more than 1.5. The maximum of the outer ratio is 2.0. A particularly preferred value for the outer ratio is 2.0.

Figure 3:
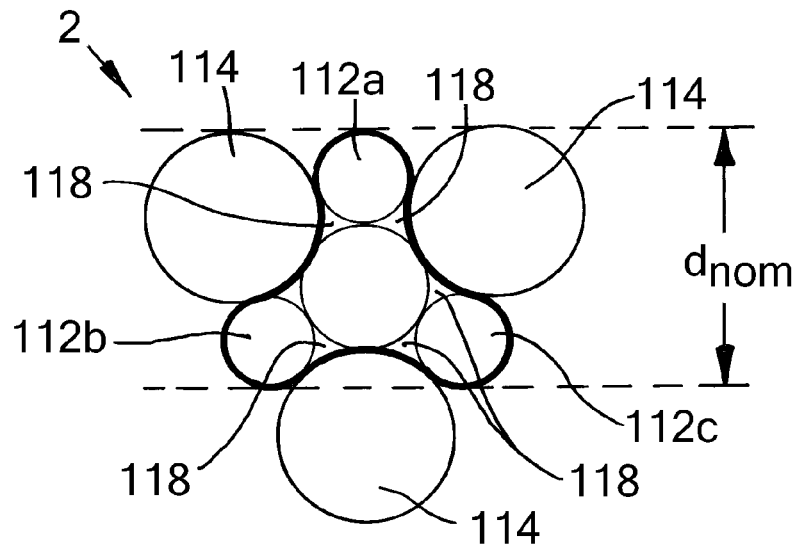
FIG. 3 is a cross-sectional view of a catalyst shape according to the present invention.

Catalyst shapes according to the present invention will be referred to as "Ta" shaped catalysts. FIG. 3 shows the cross-section of one embodiment of a shape according to the invention.

One advantage of catalysts, catalyst precursors, and catalyst carriers according to the present invention is that they show less diffusion limitation as compared to trilobe shape (TL) particles. Another advantage of the present invention is that the catalysts, catalyst precursors, and catalyst carriers show better strength properties than extended trilobe (Tx) shape particles. A further advantage of the present invention is that the particles can be made using extrusion, though other methods are also possible. Extrusion is a fast, relatively inexpensive and suitable manufacturing process to produce the catalysts, catalyst precursors, and catalyst carriers of the present invention in large quantities.

In order to produce a catalyst, catalyst precursor, or catalyst carrier according to the present invention by an extrusion process, a paste comprising the carrier and optionally the active metal or precursor therefor and optionally the promoter, is fed from a hopper into an extruder. A number of dies at the end of the extruder each comprise a plurality of small apertures through which the paste is forced. The resulting extrudate is an elongated particle suitable for use in a fixed bed reactor for instance a multitubular reactor. Other methods to produce a catalyst, catalyst precursor, or catalyst carrier according to the present invention are, for example, pelletizing and pressure moulding.

Contrary to that which may be attempted by a skilled person, the inventors of the present invention have discovered a shape which has beneficial strength properties of the trilobe shape (TL) and diffusion limitation properties of the extended trilobe (Tx) shape but surprisingly have not chosen a shape which is a hybrid of these two shapes.

When comparing the prior art shapes with the current invention using the "inner ratio" and "outer ratio" terminology, the following remark can be made with regard to the TL shape. The basic trilobed shape (TL) has no central circle and no unoccupied circles and so the ratio of the diameter of the central circle to the diameter of the outer occupied circle (inner ratio) for the basic trilobe shape can be considered to be zero. Similarly the ratio of the unoccupied circle to occupied circle (outer ratio) is also zero for the TL shape.

The central circle of the cross-section of a catalyst, catalyst precursor, or catalyst carrier according to the present invention preferably has an exposed edge. This is in contrast to the extended trilobe shape Tx in which the central circle is in contact with the outer occupied circles and the interstitial areas. In one embodiment of the present invention, the central circle preferably has three exposed edges—typically each between two occupied outer circles.

Preferably the diameters of the three outer occupied circles differ less than 5% from each other, more preferably less than 2%. Most preferably the diameters of the three outer occupied circles are the same.

Preferably the nominal diameter of the extrudates is 0.5-6 mm, preferably 1-3 mm. The nominal diameter is the length from the furthest point on one outer occupied circle through the central circle centre and extending to a line drawn between the bottom of each of the remaining outer filled circles.

After a typical process of preparation of the catalyst particles or catalyst precursor particles described herein, between 10% and 100% of the number of particles produced preferably have a nominal diameter with a deviation of less than 5% of the shape as defined in the present invention. Preferably, at least 50% of the catalyst particles have a nominal diameter with a deviation of less than 5% of the shape as defined in the present invention.

Suitably the distance between the three alternating circles and the central circle is the same. This distance is preferably less than half the diameter of the central circle, more preferably less than a quarter of the diameter of the central circle, with most preference given to particles having a cross-section in which the three alternating circles are attached to the central circle. Preferably the three alternating circles do not overlap with the central circle. Preferably therefore each outer circle tangentially contacts the central circle. In case of any overlap, the overlap of each alternating circle and the central circle will be less than 5% of the area of the central circle, preferably less than 2%, more preferably less than 1%.

Preferably said contact between each outer circle and two neighbouring circles is tangential.

It will be clear that minor deviations from the shape as defined are considered to be within the scope of the present invention. In the case where the catalyst or catalyst precursor of the present invention is prepared by an extrusion process, die-plates are used and it is known to those skilled in the art to manufacture die-plates having one or more holes in the shape of the particles according to the present invention and which tolerances can be expected in practice when producing such die-plates. In this respect it is observed that the pressure release immediately after extrusion may result in deformation of the extrudates. Usually the minor deviations are within 10%, preferably within 5%, more preferably within 2% with respect to the ideal shape as defined in the present invention.

The catalyst or catalyst carrier particles according to the present invention may have a length/diameter ratio (L/D) of at least 1. The particles according to the present invention can have a L/D in the range between 1 and 10. Preferably, the particles according to the present invention have a L/D in the range between 2 and 6, especially around 3.

Thus the invention provides a catalyst shape with reasonable strength and in which mass transfer limitations are reduced compared to certain known catalyst shapes.

The catalyst may be used for a number of different reactions, particularly diffusion limited fixed bed reactions, such as the Fischer-Tropsch reaction, but also for hydrocracking, dewaxing, hydrodesulphurization and any other suitable reaction.

A Fischer-Tropsch catalyst or catalyst precursor comprises a catalytically active metal or precursor therefor, and optionally promoters, supported on a catalyst carrier. The catalyst carrier preferably is a refractory metal oxide.

The carrier is preferably a refractory metal oxide, more preferably a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania. Most preferably the porous carrier comprises titania. One suitable carrier material is commercially available titania, for example P25 Degussa™.

The catalytically active metal is preferably a metal from Group VIII of the Periodic Table. (References herein to the Periodic Table relate to the previous IUPAC version of the Periodic Table of Elements such as that described in the 68th Edition of the Handbook of Chemistry and Physics (CPC Press)). Particular catalytically active metals include ruthenium, iron, cobalt and nickel. Cobalt and iron, especially cobalt, are preferred catalytically active metals.

Typically, the amount of metal present in the catalyst may range from 1 to 100 parts by weight per 100 parts by weight of carrier material, preferably from 3 to 50 parts by weight per 100 parts by weight of carrier material.

The active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB, VIIB and/or VIII of the Periodic Table, in particular titanium, zirconium, manganese and/or vanadium, especially manganese or vanadium. As an alternative or in addition to the metal oxide promoter, the catalyst may comprise a metal promoter selected from Groups VIIB and/or VIII of the Periodic Table. Preferred metal promoters include rhenium, ruthenium, platinum and palladium.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

One particularly preferred Fischer-Tropsch catalyst comprises a manganese or vanadium promoter on a titania carrier.

A hydrocracking catalyst typically contains one or more metals having hydrogenation activity, and supported on a carrier comprising an acidic function. Suitable hydrocracking catalysts include catalysts comprising metals selected from Groups VIB and VIII of the Periodic Table of Elements. Preferably, the hydrocracking catalysts contain one or more noble metals from Group VIII. Preferred noble metals are platinum, palladium, rhodium, ruthenium, iridium and osmium.

Most preferred catalysts for use in the hydrocracking stage are those comprising platinum.

For refinery hydrocracking nickel tungsten, nickel molybdenum may be used as can cobalt catalysts such as cobalt molybdenum and any combination of Co and Ni.

The amount of catalytically active noble metal present in the hydrocracking catalyst may vary within wide limits and is typically in the range of from about 0.05 to about 5 parts by weight per 100 parts by weight of the carrier material. The amount of non-noble metal present is preferably 5-60%, preferably 10-50%.

The catalyst may be prepared by extruding a paste comprising water (or another suitable solvent) and titania powder through any suitable extruder such as those shown and described in Perry's Chemical Engineers Handbook 7th Edition 18-29 to 18-31. A die with suitably shaped apertures are provided therein in order to shape the extrudate to the shape as defined herein.

The active metal may be impregnated after extrusion or may be added with the paste before extrusion.

Thus when the metal is added before extrusion, the following steps may take place to form the paste: mixing (i) a carrier such as a refractory oxide, (ii) a liquid, and (iii) a metal compound, which is at least partially insoluble in the amount of liquid used, to form a mixture.

Accordingly the invention also provides a method of manufacturing a catalyst carrier comprising:
(a) mixing a catalyst carrier comprising a carrier such as a refractory metal oxide or precursors thereof with a liquid to form a paste;
(b) adding said paste to an extruder, the extruder having a die plate comprising one or more dies, each die having a plurality of apertures;
(c) extruding the paste through said apertures to form catalyst carrier extrudates;
(d) wherein the apertures define a cross sectional shape as defined herein.

The apertures thus define a cross-sectional shape identical in shape to the cross-sectional shape of a catalyst, catalyst precursor, or catalyst carrier according to the present invention.

The active metal or active metal precursor may be mixed with the catalyst carrier in step (a) to form a paste. In that case a catalyst or catalyst precursor can be prepared.

The mixing of the ingredients to form the paste may be performed by kneading or mulling. The mixture obtained may have a solids content in the range of from 30 to 90% by weight, preferably from 50 to 80% by weight.

Before extrusion, the mixture may be mixed for 1 m-4 h, preferably 5 m-2 h, more preferably 10 m-1 h, especially around 15 m.

The mixing may be done at a temperature in the range of 15-60° C., preferably 20-45° C.

Any metal compound which is at least 50% by weight insoluble in the amount of liquid used, can be suitable used in the process of the invention. Preferably, at least 70% by weight of the metal compound is insoluble in the amount of liquid used, more preferably at least 80% by weight, still more preferably at least 90% by weight. Examples of suitable metal compounds are metallic powder, metal hydroxide, metal oxides or mixtures thereof, for example $Co(OH)_2$ or $CO_3O_4$.

The amount of metal compound present in the mixture may vary widely. Typically, the mixture comprises up to 60 parts by weight of metal per 100 parts by weight of refractory oxide, preferably 10-40 parts by weight. The above amounts of metal refer to the total amount of metal rather than metal compounds and can be determined by known elemental analysis techniques.

The catalytically active metal may be present in the paste together with one or more metal promoters or co-catalysts. Alternatively the promoter may be added after extrusion.

To improve the flow properties of the mixture, it is preferred to include one or more flow improving agents and/or extrusion aids in the mixture prior to extrusion. Suitable additives for inclusion in the mixture include fatty amines, quaternary ammonium compounds, polyvinyl pyridine, polyvinyl alcohol, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc.

To obtain strong extrudates, it is preferred to include in the mixture, prior to extrusion, at least one compound which acts as a peptising agent for the refractory metal oxide. Suitable peptising agents for inclusion in the extrudable mixture are well known in the art and include basic and acidic compounds. Examples of basic compounds are ammonia, ammonia-releasing compounds, ammonium compounds or organic amines. Such basic compounds are removed upon calcination and are not retained in the extrudates to impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included in the mixture, prior to extrusion, in order to create macropores in the resulting extrudates. Suitable burnout materials are commonly known in the art.

The total amount of flow-improving agents/extrusion aids, peptising agents, and burn-out materials in the mixture preferably is in the range of from 0.1 to 20% by weight, more preferably from 0.5 to 10% by weight, on the basis of the total weight of the mixture.

The paste may include other additives such as a binder, for example Tyzor™.

The liquid is preferably water although $C_1$-$C_4$ alcohols may be used, especially methanol, ethanol or propanol. Also ammonia, ethers, e.g. MTBE, and ketones, e.g. acetone or MEK; aldehydes such as propanal; and aromatic solvents such as toluene may be used. Mixtures are also possible.

Following extrusion through the apertures, the friction typically increases the temperature of the paste to around 40-70° C. especially 50-60° C. and some of the liquid is evaporated.

The resulting extrudate is typically strong and flexible.

After extrusion the catalyst carrier is typically subjected to drying and/or to calcination at a temperature of generally from 350 to 750° C., preferably a temperature in the range of from 450 to 650° C. The effect of the calcination treatment is to remove crystal water, to decompose volatile decomposition products and to convert organic and inorganic compounds to their respective oxides. After calcination, the resulting catalyst is usually activated by contacting the catalyst with hydrogen or a hydrogen-containing gas, typically at temperatures of about 200 to 450° C.

If appropriate the catalytic metal and/or the promoter are impregnated onto the dried and/or calcined carrier, optionally followed by drying and/or calcination. The drying temperature is normally between ambient temperature to 150° C.

Thus a particularly preferred catalyst comprises a titania carrier with a cobalt active metal and a manganese promoter. A process for the preparation of such catalysts is described in EP 1 042 067, the disclosure of which is incorporated herein in its entirety by reference.

The resulting catalyst is preferably used in a Fischer-Tropsch process.

The Fischer-Tropsch process is well known to those skilled in the art and involves synthesis of hydrocarbons from syngas, by contacting the syngas at reaction conditions with the Fischer-Tropsch catalyst.

The synthesis gas can be provided by any suitable means, process or arrangement. This includes partial oxidation and/or reforming of a hydrocarbonaceous feedstock as is known in the art.

Typically the synthesis gas is produced by partial oxidation of a hydrocarbonaceous feed. The hydrocarbonaceous feed suitably is methane, natural gas, associated gas or a mixture of $C_{1-4}$ hydrocarbons. The feed comprises mainly, i.e. more than 90 v/v %, especially more than 94%, $C_{1-4}$ hydrocarbons, especially comprises at least 60 v/v percent methane, preferably at least 75 percent, more preferably 90 percent. Very suitably natural gas or associated gas is used. As described above, any sulphur in the feedstock is preferably removed or at least minimized.

The partial oxidation of gaseous feedstocks, producing mixtures of especially carbon monoxide and hydrogen, can take place according to various established processes. These processes include the Shell Gasification Process. A comprehensive survey of this process can be found in the Oil and Gas Journal, Sep. 6, 1971, pp 86-90.

The oxygen containing gas for the partial oxidation typically contains at least 95 vol. %, usually at least 98 vol. %, oxygen. Oxygen or oxygen enriched air may be produced via cryogenic techniques, but could also be produced by a membrane based process, e.g. the process as described in WO 93/06041. A gas turbine can provide the power for driving at least one air compressor or separator of the air compression/separating unit. If necessary, an additional compressing unit may be used after the separation process, and the gas turbine in that case may also provide at the (re)start power for this compressor. The compressor, however, may also be started at a later point in time, e.g. after a full start, using steam generated by the catalytic conversion of the synthesis gas into hydrocarbons.

To adjust the $H_2$/CO ratio in the syngas, carbon dioxide and/or steam may be introduced into the partial oxidation process. Preferably up to 15% volume based on the amount of syngas, preferably up to 8% volume, more preferable up to 4% volume, of either carbon dioxide or steam is added to the feed. Water produced in the hydrocarbon synthesis may be used to generate the steam. As a suitable carbon dioxide source, carbon dioxide from the effluent gasses of the expanding/combustion step may be used. The $H_2/CO$ ratio of the syngas is suitably between 1.5 and 2.3, preferably between 1.6 and 2.0. If desired, (small) additional amounts of hydrogen may be made by steam methane reforming, preferably in combination with the water gas shift reaction. Any carbon monoxide and carbon dioxide produced together with the hydrogen may be used in the gasification and/or hydrocarbon synthesis reaction or recycled to increase the carbon efficiency. Hydrogen from other sources, for example hydrogen itself, may be an option.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

The Fischer-Tropsch process can be carried out in a fixed bed regime, especially a trickle flow regime and the present invention is particularly suited to a fixed bed reactor. A very suitable reactor is a multitubular fixed bed reactor. In addition, the Fischer-Tropsch process may also be carried out in a fluidized bed process.

Alternatively a slurry phase regime or an ebullating bed regime, wherein the catalyst particles are kept in suspension by an upward superficial gas and/or liquid velocity may be used.

Thus the present invention also provides a process for the production of liquid hydrocarbons from synthesis gas, the process comprising:
  converting synthesis gas in a reactor into liquid hydrocarbons, and optionally solid hydrocarbons and optionally liquefied petroleum gas, at elevated temperatures and pressures; using a catalyst prepared as described herein.

Products of the Fischer-Tropsch synthesis may range from methane to heavy paraffin waxes. Preferably, the production of methane is minimized and a substantial portion of the hydrocarbons produced have a carbon chain length of at least 5 carbon atoms. Preferably, the amount of $C_{5+}$ hydrocarbons is at least 60% by weight of the total product, more preferably, at least 70% by weight, even more preferably, at least 80% by weight, most preferably at least 85% by weight.

The hydrocarbons produced in the process are suitably $C_{3-200}$ hydrocarbons, more suitably $C_{4-150}$ hydrocarbons, especially $C_{5-100}$ hydrocarbons, or mixtures thereof. These hydrocarbons or mixtures thereof are liquid or solid at temperatures between 5 and 30° C. (1 bar), especially at about 20° C. (1 bar), and usually are paraffinic of nature, while up to 30 wt %, preferably up to 15 wt %, of either olefins or oxygenated compounds may be present.

Depending on the catalyst and the process conditions used in a Fischer-Tropsch reaction, various proportions of normally gaseous hydrocarbons, normally liquid hydrocarbons and optionally normally solid hydrocarbons are obtained. It is often preferred to obtain a large fraction of normally solid hydrocarbons. These solid hydrocarbons may be obtained up to 90 wt % based on total hydrocarbons, usually between 50 and 80 wt %.

A part may boil above the boiling point range of the so-called middle distillates. The term "middle distillates", as used herein, is a reference to hydrocarbon mixtures of which the boiling point range corresponds substantially to that of kerosene and gasoil fractions obtained in a conventional atmospheric distillation of crude mineral oil. The boiling point range of middle distillates generally lies within the range of about 150 to about 360° C.

Thus the invention also provides hydrocarbon products synthesized by a Fischer-Tropsch reaction and catalyzed by a catalyst prepared by a process as described herein.

The hydrocarbon may have undergone the steps of hydroprocessing, preferably hydrogenation, hydroisomerization and/or hydrocracking.

The hydrocarbon may be a fuel, preferably naphtha, kerosene or gasoil, a waxy raffinate or a base oil.

The higher boiling range paraffinic hydrocarbons, if present, may be isolated and subjected to a catalytic hydrocracking step, as described below. A catalyst for the hydrocracking step may also be prepared by a process as described herein.

The catalytic hydrocracking is carried out by contacting the paraffinic hydrocarbons at elevated temperature and pressure and in the presence of hydrogen with a catalyst containing one or more metals having hydrogenation activity, and supported on a carrier comprising an acidic function. A catalyst for the hydrocracking step may also be prepared by a process as described herein.

Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may be transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired.

Any percentage mentioned in this description is calculated on total weight or volume of the composition, unless indicated differently. When not mentioned, percentages are considered to be weight percentages. Pressures are indicated in bar absolute, unless indicated differently.

EXAMPLES

Figure 1:
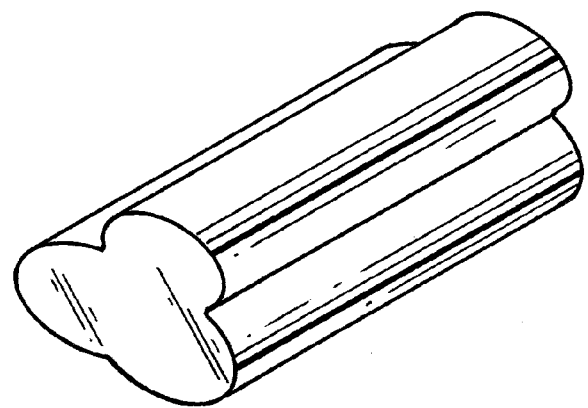
FIG. 1 is a perspective view of a prior art catalyst shape.

Embodiments of the present invention will now be described, by way of example only, with reference to the accompanying drawings, in which:

FIG. 1 shows a side view of one embodiment of a known trilobe catalyst shape with a 'cloverleaf' cross section (TL-shape).

Figure 2:
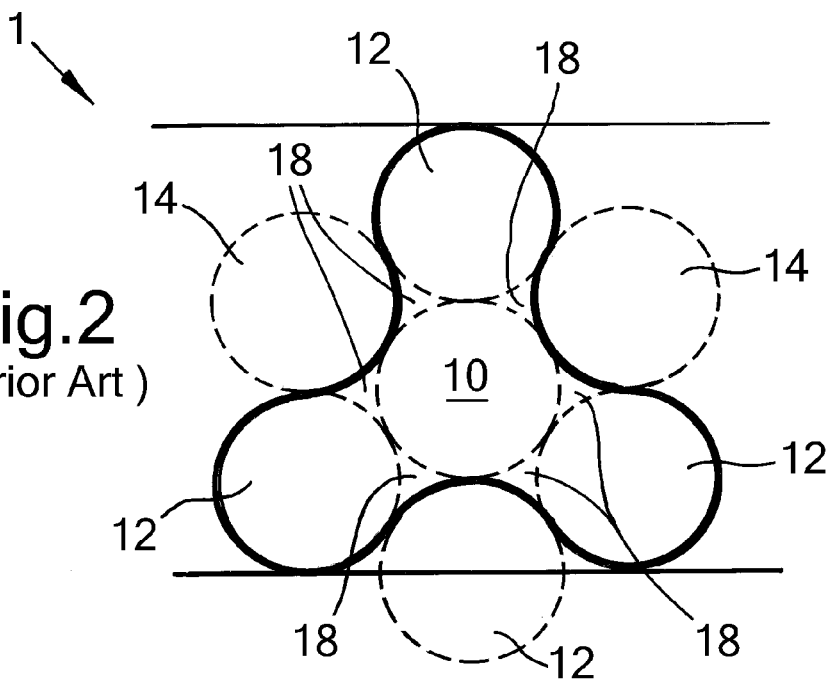
FIG. 2 is a cross-sectional view of a second prior art catalyst shape.

FIG. 2 shows a cross sectional view of one embodiment of a known extended trilobe catalyst shape (Tx-shape). The cross-section of the particle has an central circle 10 and outer occupied circles 12. Interstitial areas 18 are also occupied by the cross-section of particle 1, which is shown in bold outline. The outer circles 14 are unoccupied.

FIG. 3 shows a cross sectional view of one embodiment of a trilobe catalyst shape in accordance with the present invention.

Example 1

The cross-section of a preferred embodiment of a catalyst, catalyst precursor, or catalyst carrier according to the present invention is presented in FIG. 3. The shape is defined by a central circle 110 surrounded by six outer circles 112, 114. Only circles 110, 112 are occupied, not circles 114. Interstitial areas 118 are also occupied.

The central circle 110 has a diameter which is 1.5 times larger than that of the outer occupied circles 112. The unoccupied circles 114 have a diameter which is twice the diameter of the occupied outer circles 112. This shape of extrudate provides a surprising balance between sufficient strength whilst also minimizing diffusion limitation within a fixed bed multitubular reactor.

The nominal diameter 'd nom' is the length from the furthest point on one outer occupied circle 112a through the centre of the central circle 110 extending to a line drawn between the bottom of each of the remaining outer occupied circles 112b, 112c.

Example 2

A Fischer-Tropsch catalyst according to the present invention was prepared comprising cobalt (as catalytically active metal), manganese (as promoter), and titania (as catalyst carrier). The shape of the cross-section of the Fischer-Tropsch catalyst particles was as shown in FIG. 3. The average length of the particles was 1.7 mm.

A comparative Fischer-Tropsch catalyst was prepared comprising cobalt (as catalytically active metal), manganese (as promoter), and titania (as catalyst carrier). The shape of the Fischer-Tropsch catalyst particles was like the shape shown in FIG. 1 (TL-shape). The average length of the particles was 1.7 mm.

The $CO_2$ selectivity for these catalysts was tested. $CO_2$ is an unwanted by-product and is preferably minimized.

At a comparable operating temperature and comparable productivity, unwanted $CO_2$ production is 33% lower on the catalyst in accordance with the present invention as compared to the comparative TL-shaped catalyst.

Indeed the results for the catalyst in accordance with the present invention are obtained at much higher $N_2$ inert in the fresh feed, which typically increases the $CO_2$ produced. Thus at identical operating conditions the benefit of the catalyst shape in accordance with the present invention would be even more pronounced. The results are shown in Table 1.

TABLE 1

Comparison of $CO_2$ selectivity

| Shape | $N_2$ in fresh feed (vol %) | Results Change in $CO_2$ Selectivity (% relative) |
|---|---|---|
| Comparative TL-shaped | 3 | Base case |
| According to invention Ta-shaped | 13 | 33% lower |

Example 3

A Fischer-Tropsch catalyst according to the present invention was prepared comprising cobalt (as catalytically active metal), manganese (as promoter), and titania (as catalyst carrier). The shape of the cross-section of the Fischer-Tropsch catalyst particles was as shown in FIG. 3. The average length of the particles was 1.7 mm.

A comparative Fischer-Tropsch catalyst was prepared comprising cobalt (as catalytically active metal), manganese (as promoter), and titania (as catalyst carrier). The shape of the cross-section of the Fischer-Tropsch catalyst particles was as shown in FIG. 2 (Tx-shape). The average length of the particles was 1.7 mm.

Regarding strength, the attrition index of both catalysts was determined by rotating the catalyst particles within a drum with one internal baffle plate, over a standard number of drum rotations. The loss of material was then determined as the change in weight of material below 0.84 mm, judged as being "fines".

The attrition rate of the Tx-shaped catalyst particles was found to be over 40% greater than the attrition rate of the catalyst particles according to the present invention. This experiment thus shows that the Ta-shape is significantly stronger than the Tx-shape.

Thus catalysts in accordance with the present invention may be used in diffusion limited reactions such as the Fischer-Tropsch reaction to provide a catalyst with good $CO_2$ selectivity whilst being sufficiently strong.

Improvements and modifications may be made without departing from the scope of the invention.

What is claimed is:

1. A catalyst carrier formed as an elongated shaped particle having a cross section comprising three protrusions each extending from and attached to a central position, wherein the central position is aligned along the longitudinal axis of the particle, the cross-section of the particle occupying the space encompassed by the outer edges of six outer circles around a central circle, each of the six outer circles contacting two neighbouring outer circles, the particle occupying three alternating outer circles equidistant to the central circle and the six interstitial regions, the particle not occupying the three remaining outer circles which are between the alternating occupied outer circles;

wherein the ratio of the diameter of the central circle to the diameter of the outer occupied circle is more than 1.4 and the ratio of the diameter of the outer unoccupied circle to the diameter of the outer occupied circle is more than 1.3;

and wherein the ratio of the diameter of the outer unoccupied circle to the diameter of the outer occupied circle is more than the ratio of the diameter of the central circle to the diameter of the outer occupied circle.

2. A catalyst carrier according to claim 1, wherein the ratio of the diameter of the central circle to the diameter of the outer occupied circle is less than about 2.5.

3. A catalyst carrier as claimed in claim 1, wherein the ratio of the diameter of the outer unoccupied circle to the diameter of the outer occupied circle is more than 1.5.

4. A catalyst carrier as claimed in claim 1, wherein the ratio of the diameter of the outer unoccupied circle to the diameter of the outer occupied circle is less than about 2.0.

5. A catalyst carrier as claimed in claim 1, wherein each outer circle tangentially contacts the central circle.

6. A catalyst carrier as claimed in claim 1, wherein said contact between each outer circle and two neighbouring circles is tangential.

7. A catalyst carrier as claimed in claim 1, wherein the nominal diameter of the particle is 0.5-6 mm.

8. A catalyst carrier as claimed in claim 1, wherein the particles have a length/diameter ratio (L/D) of between 1 and 10.

9. A catalyst comprising a catalyst carrier as claimed in claim 1, and a catalytically active metal or precursor therefor supported on the catalyst carrier; wherein the catalytically active metal is selected from elements of Group VIII of the Periodic Table of the Elements.

10. A catalyst as claimed in claim 9, wherein the catalyst carrier comprises a porous refractory metal oxide.

11. A catalyst as claimed in claim 9, wherein the catalytically active metal is cobalt or iron.

12. A hydrocracking catalyst comprising a metal having hydrogenation activity, and supported on a catalyst carrier as defined in claim 1 and comprising an acidic function.

13. A method of manufacturing a catalyst carrier comprising:
   (a) mixing a catalyst carrier with a liquid to form a paste;
   (b) adding said paste to an extruder, the extruder having a die plate comprising one or more dies, each die having a plurality of apertures;
   (c) extruding the paste through said apertures to form catalyst carrier extrudates;
   (d) wherein the apertures define a cross sectional shape comprising three protrusions each extending from and attached to a central position, wherein the central position is aligned along the longitudinal axis of the particle, the cross-section of the particle occupying the space encompassed by the outer edges of six outer circles around a central circle, each of the six outer circles contacting two neighbouring outer circles, the particle occupying three alternating outer circles equidistant to the central circle and the six interstitial regions, the particle not occupying the three remaining outer circles which are between the alternating occupied outer circles;
   wherein the ratio of the diameter of the central circle to the diameter of the outer occupied circle is more than 1.4 and the ratio of the diameter of the outer unoccupied circle to the diameter of the outer occupied circle is more than 1.3;
   and wherein the ratio of the diameter of the outer unoccupied circle to the diameter of the outer occupied circle is more than the ratio of the diameter of the central circle to the diameter of the outer occupied circle.

14. The method as claimed in claim 13, wherein an active metal or active metal precursor is mixed with the catalyst carrier in step (a) to form a paste.

15. The method as claimed in claim 13, wherein the catalyst carrier comprises a refractory metal oxide or a precursor thereof.

16. The method as claimed in claim 15, wherein an active metal or active metal precursor is mixed with the catalyst carrier in step (a) to form a paste.

* * * * *